United States Patent
Ren et al.

(10) Patent No.: US 10,373,103 B2
(45) Date of Patent: Aug. 6, 2019

(54) DECISION-TREE BASED ADDRESS-STATION MATCHING

(71) Applicant: International Business Machines Corporation, Armonk, NY (US)

(72) Inventors: Chang Rui Ren, Beijing (CN); Xin Shi, Beijing (CN); Yue Tong, Beijing (CN); Bao Hua Wang, Beijing (CN); Yong Qing Xue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 14/938,050

(22) Filed: Nov. 11, 2015

(65) Prior Publication Data

US 2017/0132564 A1  May 11, 2017

(51) Int. Cl.
  *G06N 5/04* (2006.01)
  *G06N 7/00* (2006.01)
  *G06Q 10/08* (2012.01)

(52) U.S. Cl.
  CPC ......... *G06Q 10/0835* (2013.01); *G06N 5/045* (2013.01); *G06N 7/005* (2013.01)

(58) Field of Classification Search
  CPC ............... G06Q 10/0835; G06N 5/045; G07B 2017/00451; G07B 2017/00475; G06F 16/686; G06F 16/903; G06F 16/90344
  USPC .......................................................... 705/337
  See application file for complete search history.

(56) References Cited

U.S. PATENT DOCUMENTS

| | | | |
|---|---|---|---|
| 7,031,959 B2* | 4/2006 | Garner | G06F 17/30495 |
| 8,126,917 B2* | 2/2012 | Funcke | G06Q 10/08 |
| | | | 705/406 |
| 8,843,464 B2* | 9/2014 | Winslow | G07B 17/00508 |
| | | | 707/705 |
| 2002/0124015 A1* | 9/2002 | Cardno | G06Q 30/02 |
| 2007/0140248 A1* | 6/2007 | Guo | H04L 12/413 |
| | | | 370/392 |

(Continued)

FOREIGN PATENT DOCUMENTS

| | | |
|---|---|---|
| CN | 1225484 A | 8/1999 |
| CN | 101350012 A | 1/2009 |

(Continued)

OTHER PUBLICATIONS

A geocoding algorithm based on a comparative study of address matching techniques by Bas Ranzijin (Year: 2013).*

*Primary Examiner* — Brian M Epstein
*Assistant Examiner* — Zeina Elchanti
(74) *Attorney, Agent, or Firm* — Francis Lammes; Stephen J. Walder, Jr.; Grant A. Johnson (57) ABSTRACT

A mechanism is provided for matching an address to an optimal station for package delivery. Responsive to the at least one keyword k appearing in a substring of an address addr associated with a package to be delivered appearing in a keyword to station probability matrix associated with a city and/or district associated with the address addr associated with the package, for a set of keywords k in the substring of the address addr and station s of the city and/or district, a determination is made of a priority value function v that represents the priority of the combination of keyword k and station s. A critical keyword k* and optimal station s* is identified and the optimal station s* with a maximum determined value for delivery of the package is reported.

17 Claims, 7 Drawing Sheets

(56) References Cited

U.S. PATENT DOCUMENTS

2012/0265778 A1    10/2012  Chen

FOREIGN PATENT DOCUMENTS

| CN | 103605752 A | 2/2014 |
| WO | WO2015/027837 A1 | 3/2015 |

* cited by examiner

DECISION-TREE BASED ADDRESS-STATION MATCHING

BACKGROUND

The present application relates generally to an improved data processing apparatus and method and more specifically to mechanisms for decision-tree based address-station matching.

In any given day, more than 14 million packages and documents are picked up and more than 14 million other packages and documents are delivered worldwide. More than 80 percent of the packages that are picked up on one day are delivered to their destination within 48 hours. In that 48 hours, one of the biggest, most impressive step is sorting the packages so that the packages are delivered to their correct destination. Currently, packages being shipped have labels that identify the person to whom the package is being delivered, an address where the package is being delivered, and, if the label is printed using a shipping service system, a code that identifies a destination station and/or hub that services the address where the package is being delivered. Utilizing this information, the shipping service routes the package to the correct hub, then to the correct station, and then to the correct address using a hub-and-spoke logistics network. Thus, a package may be processed from the originating address, though a station, one or more hubs, to a destination station, and then to the destination address.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for matching an address to an optimal station for package delivery. The illustrative embodiment determines whether at least one keyword k in a substring of an address addr associated with a package to be delivered appears in a keyword to station probability matrix associated with a city and/or district associated with the address addr associated with the package. Responsive to the at least one keyword k appearing in the keyword to station probability matrix, for a set of keywords k in the substring of the address addr and station s of the city and/or district, the illustrative embodiment determines a priority value function v that represents the priority of the combination of keyword k and station s, using:

$$v(k,s) = Pks + \varepsilon * len(k)$$

where v is the value function that represents the priority of the combination of keyword k and station s, p is the probability of the keyword to the station from the associated keyword to station probability matrix, $\varepsilon$ is a pre-defined small number, and len is the function to calculate the length of a string. The illustrative embodiment identifies a critical keyword k* and optimal station s* using:

$$(k^*, s^*) = \arg\max v(k,s)$$

where v is the value function that represents the priority of the combination of keyword k and station s and arg max is the argument of the maximum that is the set of points of the given argument for which the given function attains its maximum value. The illustrative embodiment reports the optimal station s* with a maximum determined value for delivery of the package.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, in any given day, more than 80 percent of the more than 14 million packages picked up on one day are delivered to their destination within 48 hours. However, some of the other 20 percent of the packages that are not delivered within 48 hours are delayed due to difficulties experienced by the shipping services in identifying the destination address, one such example is Chinese addresses. While a package being shipped to China may indicate the person to whom the package is being delivered, an address where the package is being delivered, and, if the label is printed using a shipping service system, a code that identifies a destination station and/or hub that services the address where the package is being delivered, once the package arrives at the hub and/or station in China, delivering the package to the correct address may be difficult.

Figure 1:
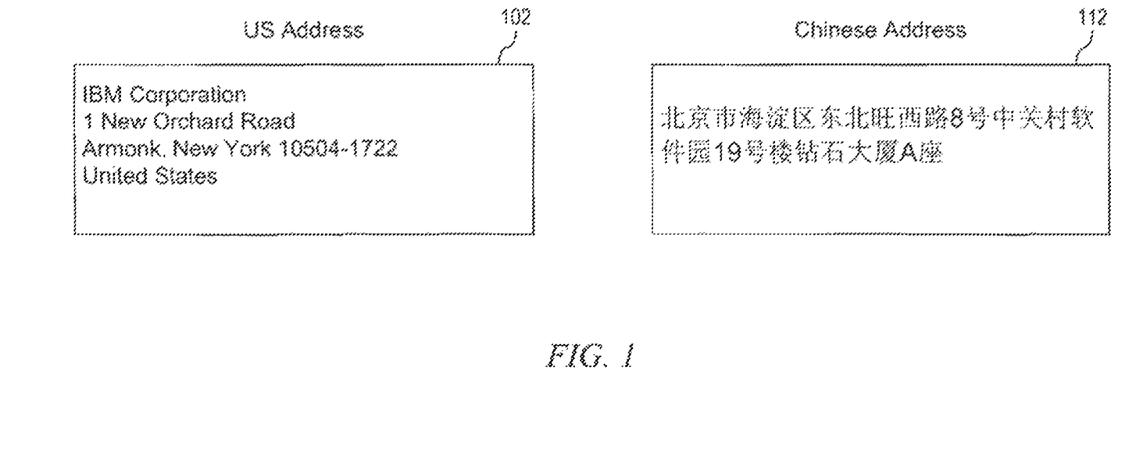
FIG. 1 depicts an exemplary comparison of a US address to a Chinese address in accordance with an illustrative embodiment.

That is, with reference to FIG. 1, in US address 102, English words are separated by spaces. However, in Chinese address 112, the Chinese words are not separated by any spaces. Furthermore, while US address 102 has a standard format, Chinese address 112 does not. Still further, while US address 102 uses a postal code or zip code of 5 digits or 9 (5+4) digits, which is precise enough for package delivery, many Chinese package delivery companies either do not require a postal code whatsoever, or the postal codes that are provided are not precise enough. Thus, most Chinese customers are not used to providing destination postal codes. By not having any postal code or not having precise postal codes, matching the requested destination address to the correct destination address results in matching errors which further results in high distribution costs and low service levels.

In order to remedy situations where addresses are not separated by spaces, are not in a standard format, have missing or imprecise postal codes, or the like, shipping services are currently using manual means that require workers to be trained to memorize all the stations and their corresponding areas. However, relying on workers requires long training times and often times has high error rates. That is, even after a worker is trained, similar addresses result in confusion, no one worker can memorize all road and building names, and, due to the millions of packages that need to be processed every day, fatigue, high pressure, and the like, lead to more errors.

The illustrative embodiments provide mechanisms for decision-tree based address-station matching. In order to generate a decision tree for use in decision-tree based address-station matching, the address-station mechanism initiates a learning process where a set of given addresses are processed to modify each address so that keyword extraction may be performed thereby forming a set of modified addresses. The address-station matching mechanism extracts keywords from the set of modified addresses. The address-station matching mechanism generates a keyword to station frequency probability matrix. For any ambiguous keyword, the address-station matching mechanism performs a keyword correction utilizing one or more other keywords associated with the ambiguous keyword thereby forming a keyword to station correction matrix. Using the keyword to station probability matrices and the keyword to station correction matrices, the address-station matching mechanism then enters a matching process where each new address is matched to a proper station using the matrices. For any new address that comprises an ambiguous keyword as a critical keyword, the address-station matching mechanism performs the keyword correction process utilizing one or more other keywords associated with the ambiguous keyword. Thus, the illustrative embodiments provide an address-station matching mechanism that utilizes a decision-tree based matching schema to extract keywords from historical addresses and delivery records in order to match addresses to stations using a keyword to station probability matrix while continuously eliminating ambiguity using the keyword to station correction matrix.

Before beginning the discussion of the various aspects of the illustrative embodiments, it should first be appreciated that throughout this description the term "mechanism" will be used to refer to elements of the present invention which perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
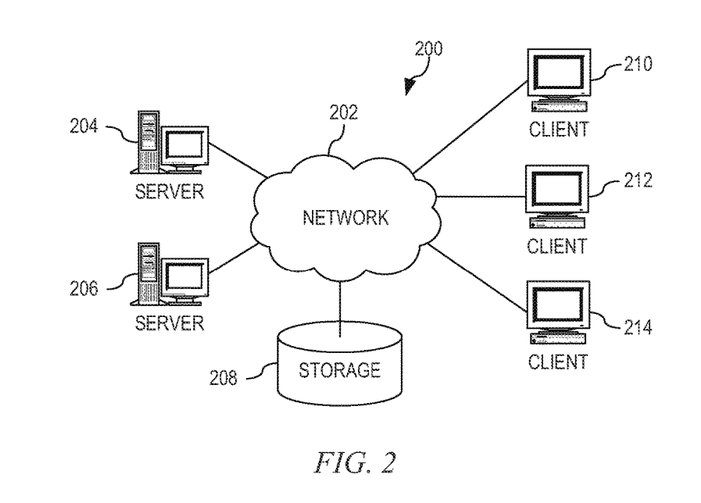
FIG. 2 is an example diagram of a distributed data processing system in which aspects of the illustrative embodiments may be implemented.
Figure 3:
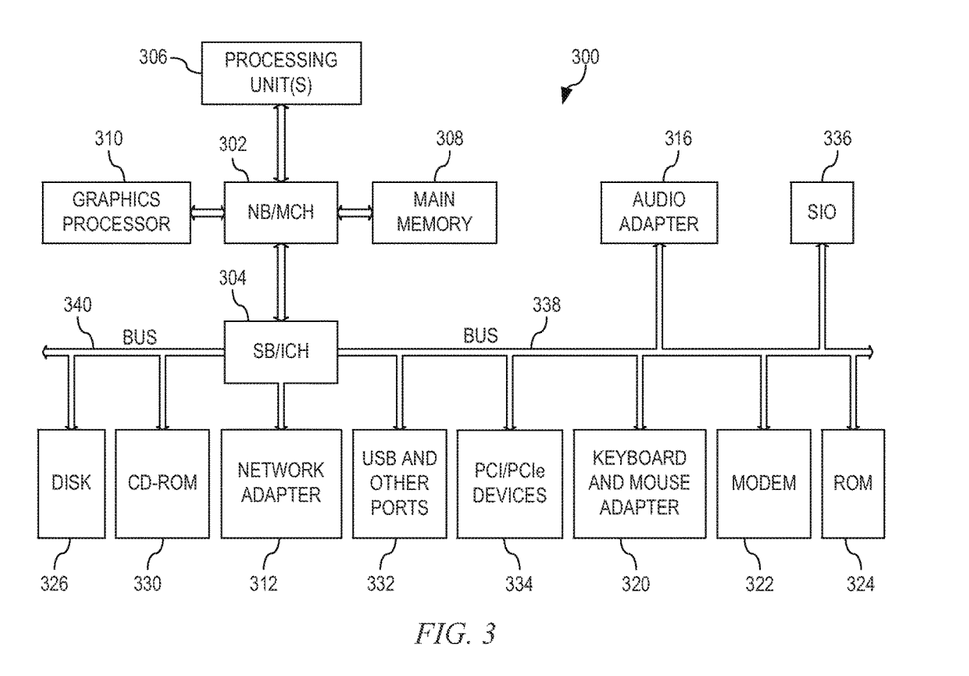
FIG. 3 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 2 and 3 are provided hereafter as example environments in which aspects of the illustrative embodiments may be implemented. It should be appreciated that FIGS. 2 and 3 are only examples and are not intended to assert or imply any limitation with regard to the environments in which aspects or embodiments of the present invention may be implemented. Many modifications to the depicted environments may be made without departing from the spirit and scope of the present invention.

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

As shown in FIG. 2, one or more of the computing devices, e.g., server 204, may be specifically configured to implement a decision-tree based address-station matching mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates a decision-tree based address-station matching mechanism.

As noted above, the mechanisms of the illustrative embodiments utilize specifically configured computing devices, or data processing systems, to perform the operations for matching a station using a decision-tree based address-station matching mechanism. These computing devices, or data processing systems, may comprise various hardware elements which are specifically configured, either through hardware configuration, software configuration, or a combination of hardware and software configuration, to implement one or more of the systems/subsystems described herein. FIG. 3 is a block diagram of just one example data processing system in which aspects of the illustrative embodiments may be implemented. Data processing system 300 is an example of a computer, such as server 204 in FIG. 2, in which computer usable code or instructions implementing the processes and aspects of the illustrative embodiments of the present invention may be located and/or executed so as to achieve the operation, output, and external effects of the illustrative embodiments as described herein.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM eServer™ System p® computer system, Power™ processor based computer system, or the like, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, in some illustrative embodiments the mechanisms of the illustrative embodiments may be implemented as application specific hardware, firmware, or the like, application software stored in a storage device, such as HDD 326 and loaded into memory, such as main memory 308, for executed by one or more hardware processors, such as processing unit 306, or the like. As such, the computing device shown in FIG. 3 becomes specifically configured to implement the mechanisms of the illustrative embodiments and specifically configured to perform the operations and generate the outputs described hereafter with regard to the decision-tree based address-station matching mechanism.

Those of ordinary skill in the art will appreciate that the hardware in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PD), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4:
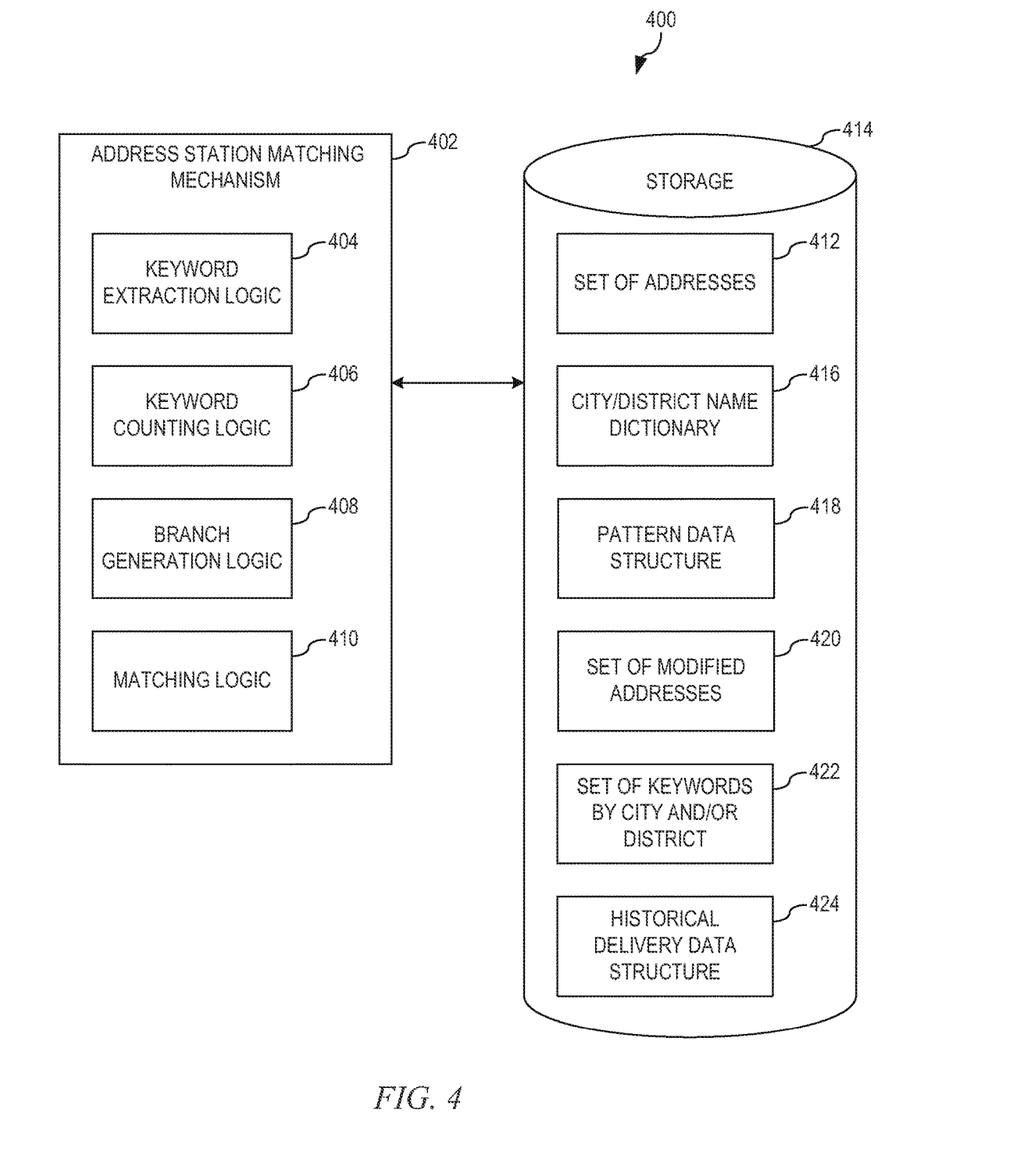
FIG. 4 depicts a functional block diagram of an address-station matching mechanism that matches addresses using a decision tree in accordance with an illustrative embodiment.
Figure 5:
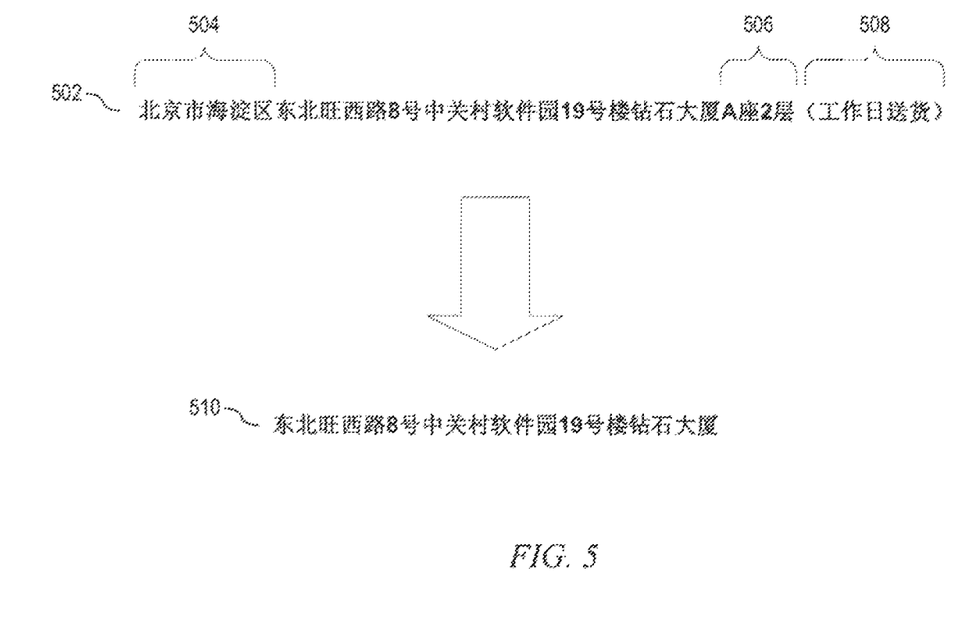
FIG. 5 depicts an example of keyword extraction in accordance with an illustrative embodiment.

FIG. 4 depicts a functional block diagram of an address-station matching mechanism that matches addresses using a decision tree in accordance with an illustrative embodiment. Address-station matching mechanism 402, in data processing system 400, comprises keyword extraction logic 404, keyword counting logic 406, branch generation logic 408, and matching logic 410. In order to generate a decision tree for use in decision-tree based address-station matching, keyword extraction logic 404 processes a set of addresses 412 associated with a particular city and/or district in storage 414 so that keyword extraction may be performed on each address in the set of addresses 412. For example, in accordance with an illustrative embodiment, for each address from the set of addresses 412, such as, with reference to FIG. 5, address 502, keyword extraction logic 404 identifies and removes the city and/or district name 504 in the address 502 using a city/district name dictionary 416. Keyword extraction logic 404 then identifies and removes room numbers, building numbers, or the like 506, in the address 502 using pattern data structure 418. Finally, keyword extraction logic 404 identifies and removes useless parentheticals 508 in the address 502 thereby forming modified address 510. Thus, for the set of addresses 412, keyword extraction logic 404 forms a set of modified addresses 420.

Keyword extraction logic 404 then extracts keywords from the set of modified addresses 420. In order to extract the keywords, keyword extraction logic 404 concatenates set of modified addresses 420 associated with the particular city and/or district into a long character string. From the long character string, keyword extraction logic 404 identifies a keyword k if one or more of the following conditions are met:
  keyword k has more than L characters,
  keyword k occurs more than M times,
  if any string k' containing keyword k as a substring is already a keyword, keyword k should occur at least N times more than k',
  only a number cannot be a keyword.

Keyword extraction logic 404 counts the occurrence of each word in a string efficiently using suffix tree. For those keywords that are identified, keyword extraction logic 404 generates a set of keywords by city and/or district 422.

Figure 6:
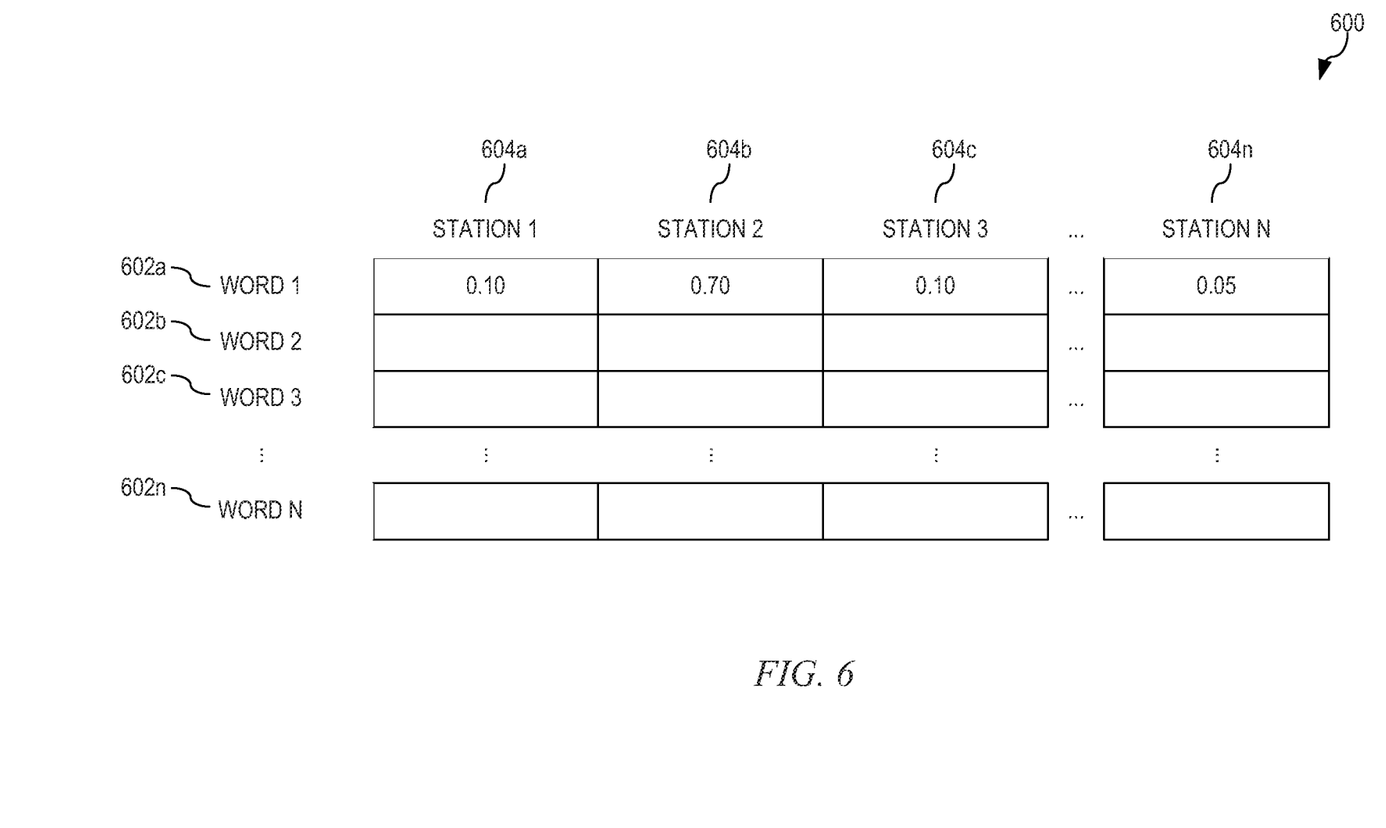
FIG. 6 depicts an exemplary keyword to station frequency probability matrix in accordance with an illustrative embodiment.

Using the set of keywords by city and/or district 422, keyword counting logic 406 generates a keyword to station frequency probability matrix. That is, keyword counting logic 406 generates keyword to station probability matrix $P=\{p_{ks}\}$ for each city/district. FIG. 6 depicts an exemplary keyword to station frequency probability matrix in accordance with an illustrative embodiment. As is illustrated, in keyword to station frequency probability matrix 600, for each keyword 602a, 602b, 602c, . . . , 602n, keyword counting logic 406 calculates a probability based on the keywords' occurrences in relation to stations 604a, 604b, 604c, . . . , 604n associated with the city and/or district. For example, in FIG. 6, the number 0.70 at row Word 1 (602a) and column Station 2 (604b) means 70% of addresses that comprise Word 1 use Station 2 as the optimal station. While the illustration depicts one embodiment where the keyword to station frequency probability matrix 600 is populated with a probability for each word and station combination, in another embodiment, the keyword to station frequency probability matrix may only be populated with the highest calculated probability for a given word as address-station matching mechanism 402 only utilizes the highest calculated probability in the following process, as will be described hereafter.

While keyword counting logic 406 creates the keyword to station frequency probability matrix for those keywords that meet the above requirements, most matching errors are caused by ambiguity between keywords that are close in spelling. Therefore, for any ambiguous keyword in an ambiguous keyword set associated with the particular city and/or district, branch generation logic 408 constructs a keyword to station correction matrix $C=\{p_{ks}\}$ for each ambiguous keyword. That is, if a critical keyword of an address is ambiguous, branch generation logic 408 utilizes one or more other keywords associated with the keyword to determine the correct station. In order to perform this operation, for each address addr in historical delivery data structure 424, branch generation logic 408 uses preliminary address matching to calculate a preliminary keyword associated with the address addr ($k^*_{addr}$) and a preliminary station associated with the address addr ($s^*_{addr}$). Assuming that the correct station associated with the address is $t_{addr}$, branch generation logic 408 identifies a list of critical keywords K' that lead to a wrong station using the following formula, thereby forming an ambiguous keyword set:

$$K'=\{k^*_{addr}|s^*_{addr} \neq t_{addr}\}.$$

With the list of critical keywords K' that lead to the wrong station, branch generation logic 408 generates keyword frequency statistics for ambiguous keywords. That is, for each ambiguous keyword k'∈K', branch generation logic 408 identifies all historical addresses in historical delivery data structure 424 that contain keyword k' and removes keyword k' in those addresses. Branch generation logic 408 then generates the keyword to station correction matrix $C=\{p_{ks}\}$ for keyword k'.

Using the keyword to station probability matrices and the keyword to station correction matrices, the address-station matching mechanism 402 then enters a matching process where each new address is matched to a proper station using the matrices. In this process, matching logic 410 determines, for each keyword k in a substring of an address addr and each station s, a priority value function v that represents the priority of the combination of keyword k and station s, using the following equation:

$$v(k,s)=Pks+\varepsilon*len(k)$$

where v is the value function that represents the priority of the combination of keyword k and station s, p is the probability of the keyword to the station from the associated keyword to station probability matrix, ε is a pre-defined small number, and len is the function to calculate the length of a string. Matching logic 410 then determines the critical keyword k* and optimal station s* using:

$$(k^*,s^*)=\arg\max v(k,s)$$

where v is the value function that represents the priority of the combination of keyword k and station s, and arg max is the argument of the maximum that is the set of points of the given argument for which the given function attains its maximum value. Matching logic 410 determines whether the critical keyword k* in the address addr associated with the package appears in the ambiguous keyword set associated with the particular city and/or district. If matching logic 410 determines that the critical keyword k* does not appear in the ambiguous keyword set, matching logic 410 may compare the maximum determined value to a predetermined threshold and, if the maximum determined value is not greater than the threshold, matching logic 410 may report the optimal station s* with an additional indication of "uncertain." If the maximum determined value is greater than the threshold, matching logic 410 reports the optimal station s* for delivery of the package and updates historical delivery data structure 424. If matching logic 410 determines that the keyword k* appears in the ambiguous keyword set, matching logic 410 removes the keyword k* from the address addr and redefines the priority value function v with the keyword to station correction matrix associated with the critical keyword k* and the particular city and/or district utilizing the following redefine priority value function v as:

$$v(k,s)=Pks+\varepsilon*len(k)$$

where v is the value function that represents the priority of the combination of keyword k and station s, p is the probability of the keyword to the station from the associated keyword to station correction matrix, ε is a pre-defined small number, and len is the function to calculate the length of a string.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing, apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
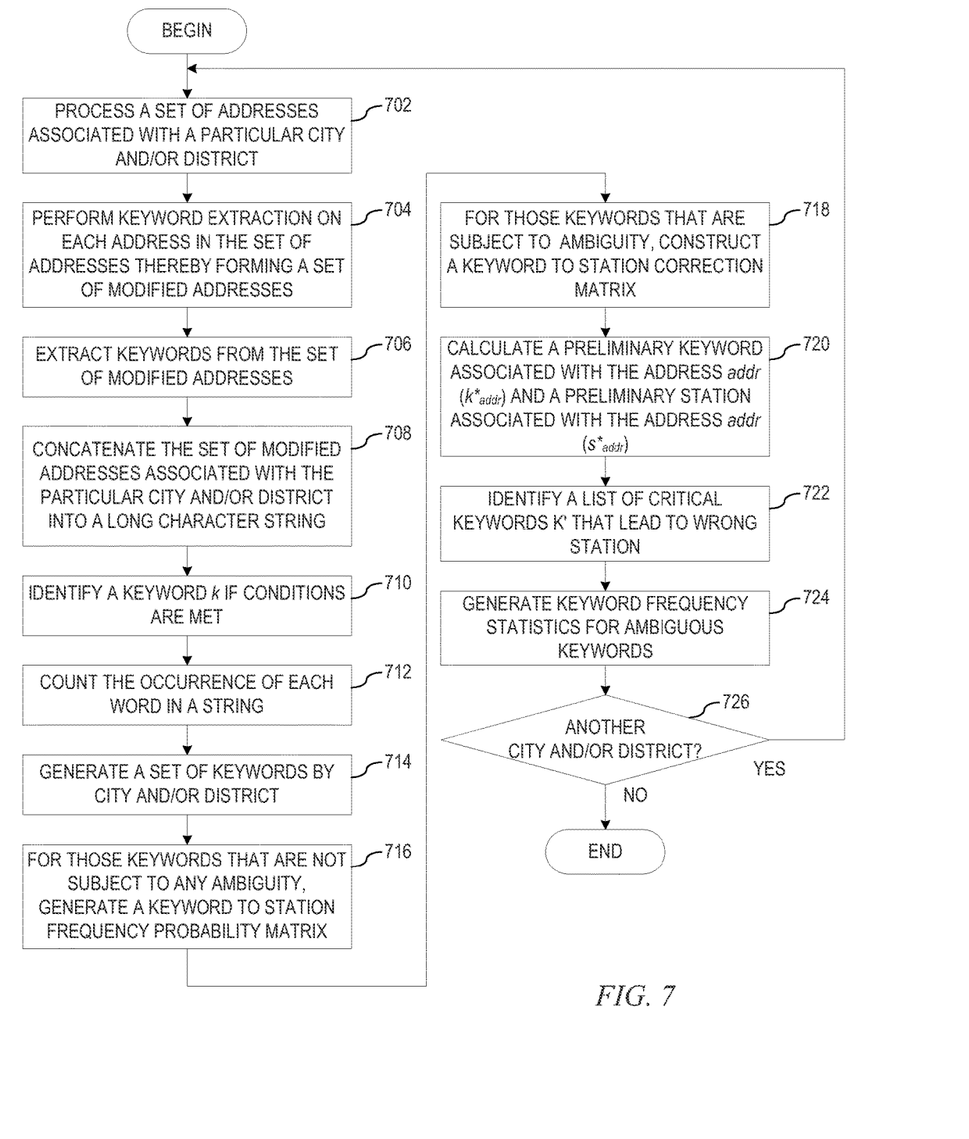
FIG. 7 depicts a flowchart of the operation performed by an address-station matching mechanism in generating a decision tree for use in decision-tree based address-station matching in accordance with an illustrative embodiment.

FIG. 7 depicts a flowchart of the operation performed by an address-station matching mechanism in generating a decision tree for use in decision-tree based address-station matching in accordance with an illustrative embodiment. As the operation begins, the address-station matching mechanism processes a set of addresses associated with a particular city and/or district (step 702). The address-station matching mechanism then performs keyword extraction on a plurality of addresses from the set of addresses (step 704). For example, the address-station matching mechanism identifies and removes one or more of a city and/or district name in the address using a city/district name dictionary, room numbers, building numbers, or the like, in the address using a pattern data structure, useless parentheticals in the address, or the like, thereby forming a set of modified addresses.

The address-station matching mechanism then identifies keywords from the set of modified addresses (step 706). Identification of keywords includes the address-station matching mechanism concatenating the set of modified addresses associated with the particular city and/or district into a long character string (step 708) and identifying a keyword k if one or more of the following conditions are met (step 710):

keyword k has more than L characters,
keyword k occurs more than M times,
if any string k' containing keyword k as a substring is already a keyword, keyword k should occur at least N times more than k',
only a number cannot be a keyword.

The address-station matching mechanism counts the occurrence of each word in a string efficiently using suffix tree (step 712). For those keywords that are identified, the address-station matching mechanism generates a set of keywords by city and/or district (step 714). Using the set of keywords by city and/or district, the address-station matching mechanism generates a keyword to station frequency probability matrix $P=\{p_{ks}\}$ (step 716) for those keywords that are not subject to any ambiguity, i.e., keywords where at least one keyword k probability for a at least one station s is above a predetermined threshold.

For those keywords k that are identified as ambiguous, i.e., keywords where at no keyword k probability for no station s is above the predetermined threshold, the address-station matching mechanism constructs a keyword to station correction matrix $C=\{p_{ks}\}$ for each ambiguous keyword associated with the particular city and/or district (step 718). Generating the ambiguous keyword set includes, for each address addr in a historical delivery data structure, the address-station matching mechanism calculates a preliminary keyword associated with the address addr ($k^*_{addr}$) and a preliminary station associated with the address addr ($s^*_{addr}$)(step 720), assuming that the correct station associated with the address is $t_{addr}$, and identifying a list of critical keywords K' that lead to a wrong station (step 722) using the following formula:

$$K'=\{k^*_{addr}|s^*_{addr}\neq t_{addr}\}.$$

With the list of critical keywords K' that lead to the wrong station, the address-station matching mechanism generates keyword frequency statistics for ambiguous keywords (step 724). That is, for each ambiguous keyword k'∈K', the address-station matching mechanism identifies all historical addresses in the historical delivery data structure that contain keyword k' and removes keyword k' in those addresses.

The address-station matching mechanism then determines whether there is another city and/or district for which to create a keyword to station probability matrix and ambiguous keyword set (step 726). If at step 726 there is another city and/or district, then the operation returns to step 702. If at step 726 there is not another city and/or district, then the operation ends. Thus, at the end of the learning process, the address-station matching mechanism has established a set of keyword to station probability matrices and a set of the keyword to station correction matrices for the different cities and/or districts.

Figure 8:
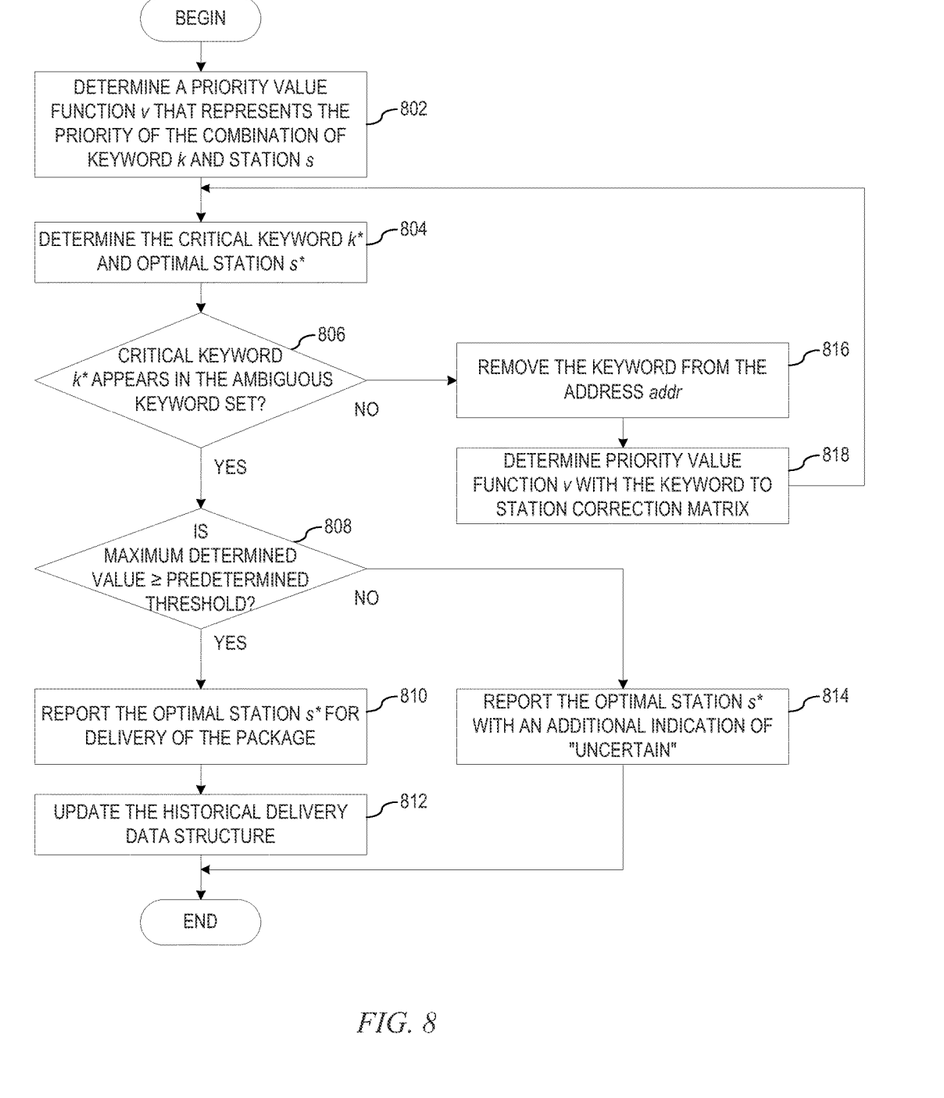
FIG. 8 depicts a flowchart of the operation performed by an address-station matching mechanism in matching an address to an optimal station associated with a particular city and/or district in accordance with an illustrative embodiment.

FIG. 8 depicts a flowchart of the operation performed by an address-station matching mechanism in matching an address to an optimal station associated with a particular city and/or district in accordance with an illustrative embodiment. As the operation begins, the address-station matching mechanism determines, for a set of keywords k in a substring of the address addr associated with the package and each station s, a priority value function v that represents the priority of the combination of keyword k and station s (step 802), using the following equation:

$$v(k,s)=Pks+\varepsilon*len(k)$$

where v is the value function that represents the priority of the combination of keyword k and station s, p is the probability of the keyword to the station from the associated keyword to station probability matrix, ε is a pre-defined small number, and len is the function to calculate the length of a string. The address-station matching mechanism determines the critical keyword k* and optimal station s* (step 804) using:

$$(k^*, s^*) = \arg\max v(k,s),$$

where v is the value function that represents the priority of the combination of keyword k and station s, and arg max is the argument of the maximum that is the set of points of the given argument for which the given function attains its maximum value. The address-station matching mechanism determines whether the critical keyword k* in the address addr associated with the package appears in an ambiguous keyword set associated with the particular city and/or district (step 806). If at step 806 the critical keyword k* appears in the ambiguous keyword set, the address-station matching mechanism then determines whether the maximum determined value is greater than or equal to a predetermined threshold (step 808). If at step 808 the address-station matching mechanism determines that the maximum determined value is greater than or equal to the predetermined threshold, the address-station matching mechanism reports the optimal station s* for delivery of the package (step 810) and updates the historical delivery data structure (step 812), with the operation terminating thereafter. If at step 808 the address-station matching mechanism determines that the maximum determined value fails to be greater than or equal to the predetermined threshold, the address-station matching mechanism reports the optimal station s* with an additional indication of "uncertain" (step 814), with the operation terminating thereafter.

If at step 806 the critical keyword k* does not appear in the ambiguous keyword set, the address-station matching mechanism removes the keyword k* from the address addr (step 816), and redefines the priority value function v with the keyword to station correction matrix associated with the critical keyword k* and the particular city and/or district (step 818), i.e. redefine priority value function v as:

$$v(k,s) = Pks + \varepsilon^* len(k)$$

where v is the value function that represents the priority of the combination of keyword k and station s, p is the probability of the keyword to the station from the associated keyword to station correction matrix, ε is a pre-defined small number, and len is the function to calculate the length of a string. The operation returns to step 804 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for address-station matching that utilizes a decision-tree based matching schema to extract keywords from historical addresses and delivery records in order to match addresses to stations using a keyword to station probability matrix while continuously eliminating ambiguity using the keyword to station correction matrix.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory coupled to the at least one processor, the at least one memory comprising instructions that are executed by the at least one processor to cause the at least one processor to be configured to implement an address-station matching mechanism for matching an address to an optimal station for package delivery, the method comprising:

determining, by matching logic within the address-station matching mechanism of the data processing system, whether at least one keyword k in a substring of an address addr associated with a package to be delivered appears in a keyword to station probability matrix associated with a city and/or district associated with the address addr associated with the package;

responsive to the at least one keyword k appearing in the keyword to station probability matrix, for a set of keywords k in the substring of the address addr and station s of the city and/or district, determining, by the matching logic, a priority value function v that represents a priority of a combination of keyword k and station s, using:

$$v(k,s)=Pks+\varepsilon *len(k)$$

where v is the priority value function that represents the priority of the combination of keyword k and station s, p is a probability of a keyword to a station from the associated keyword to station probability matrix, $\varepsilon$ is a pre-defined small number, and len is a function to calculate a length of a string;

identifying, by the matching logic, a critical keyword k* and optimal station s* using:

$$(k^*,s^*)=\arg \max v(k,s)$$

where v is the priority value function that represents the priority of the combination of keyword k and station s and arg max is an argument of a maximum that is a set of points of the given argument for which a given fuction attains its maximum value; and reporting, by the matching logic, an optimal station s* with a maximum determined value for delivery of the package.

2. the method of claim 1, further comprising:
prior to reporting the optimal station s* for delivery of the package, determining, by the matching logic, whether the maximum determined value for delivery of the package is greater than or equal to a predetermined threshold; and
responsive to the maximum determined value for delivery of the package being greater than or equal to the predetermined threshold, reporting, by the matching logic, the optimal station s* for delivery of the package.

3. The method of claim 1, further comprising:
prior to reporting the optimal station s* for delivery of the package, determining, by the matching logic, whether the maximum determined value for delivery of the package is greater than or equal to a predetermined threshold; and
responsive to the maximum determined value for delivery of the package failing to be greater than or equal to the predetermined threshold, reporting, by the matching logic, the optimal station s* for delivery of the package with an additional indication of uncertain.

4. The method of claim 1, wherein the keyword to station probability matrix is generated by the method comprising:
processing, by keyword counting logic within the address-station matching mechanism of the data processing system, a set of addresses associated with a particular city and/or district;
performing, by the keyword counting logic, keyword extraction on a set of addresses addr in the set of addresses thereby forming a set of modified addresses;
identifying, by the keyword counting logic, keywords from the set of modified addresses;
counting, by the keyword counting logic, an occurrence of each of the set of keywords in a concatenated string of the set of modified address; and
generating, by the keyword counting logic, the keyword to station frequency probability matrix using counts of each of the set of keywords whose probability for at least one station s is above a predetermined threshold.

5. The method of claim 4, wherein performing the keyword extraction includes at least one of removing one or more of a city and/or district name in the address addr using a city/district name dictionary, removing room numbers or building numbers in the address addr using a pattern data structure, or removing useless parentheticals in the address addr.

6. The method of claim 4, wherein identifying keywords from the set of modified addresses comprises:
concatenating, by keyword extraction logic within the address-station matching mechanism of the data processing system, the set of modified addresses into a long character string; and
identifying, by the keyword extraction logic, a keyword k if one or more conditions are met, wherein the one or more conditions are keyword k has more than L characters, keyword k occurs more than M times, if any string k' containing keyword k as a substring is already a keyword, keyword k should occur at least N times more than k', or only a number cannot be a keyword.

7. A computer program product comprising a computer readable storage medium having a computer readable program stored therein, wherein the computer readable program, when executed on a computing device, causes the computing device to implement an address-station matching mechanism for matching an address to an optimal station for package delivery, and further causes the computing device to:
determine, by matching logic within the address-station matching mechanism whether at least one keyword k in a substring of an address addr associated with a package to be delivered appears in a keyword to station probability matrix associated with a city and/or district associated with the address addr associated with the package;
responsive to the at least one keyword k appearing in the keyword to station probability matrix, for a set of keywords k in the substring of the address addr and station s of the city and/or district, determine, by the matching logic, a priority value function v that represents a priority of a combination of keyword k and station s, using:

$$v(k,s)=Pks+\varepsilon *len(k)$$

where v is the priority value function that represents the priority of the combination of keyword k and station s, p is a probability of a keyword to a station from the associated keyword to station probability matrix, $\varepsilon$ is a pre-defined small number, and len is a function to calculate a length of a string;

identify, by the matching logic, a critical keyword k* and optimal station s* using:

$$(k^*,s^*)=\arg \max v(k,s)$$

where v is the priority value function that represents the priority of the combination of keyword k and station s and arg max is an argument of a maximum that is a set of points of the given argument for which a given function attains its maximum value; and report, by the matching logic, an optimal station s* with a maximum determined value for delivery of the package.

8. The computer program product of claim 7, wherein the computer readable program further causes the computing device to:
prior to reporting the optimal station s* for delivery of the package, determine, by the matching logic, whether the maximum determined value for delivery of the package is greater than or equal to a predetermined threshold; and responsive to the maximum determined value for delivery of the package being greater than or equal to the predetermined threshold, report, by the matching logic, the optimal station s* for delivery of the package.

9. The computer program product of claim 7, wherein the computer readable program further causes the computing device to:

prior to reporting the optimal station s* for delivery of the package, determining, by the matching logic, whether the maximum determined value for delivery of the package is greater than or equal to a predetermined threshold; and responsive to the maximum determined value for delivery of the package failing to be greater than or equal to the predetermined threshold, report, by the matching logic, the optimal station s* for delivery of the package with an additional indication of uncertain.

10. The computer program product of claim 7, wherein the computer readable program generates the keyword to station probability matrix by further causing the computing device to:

process, by keyword counting logic within the address-station matching mechanism, a set of addresses associated with a particular city and/or district;

perform, by the keyword counting logic, keyword extraction on a set of addresses addr in the set of addresses thereby forming a set of modified addresses;

identify, by the keyword counting logic, keywords from the set of modified addresses;

count, by the keyword counting logic an occurrence of each of the set of keywords in a concatenated string of the set of modified address; and generate, by the keyword counting logic, the keyword to station frequency probability matrix using counts of each of the set of keywords whose probability for at least one station s is above a predetermined threshold.

11. The computer program product of claim 10, wherein the computer readable program to perform the keyword extraction includes the computer readable program further causing the computing device to perform at least one of removing one or more of a city and/or district name in the address addr using a city/district name dictionary, removing room numbers or building numbers in the address addr using a pattern data structure, or removing useless parentheticals in the address addr.

12. The computer program product of claim 10, wherein the computer readable program to identify keywords from the set of modified addresses further causes the computing device to:

concatenate, by keyword extraction logic within the address-station matching mechanism, the set of modified addresses into a long character string; and identify, by the keyword extraction logic, a keyword k if one or more conditions are met, wherein the one or more conditions are keyword k has more than L characters, keyword k occurs more than M times, if any string k' containing keyword k as a substring is already a keyword, keyword k should occur at least N times more than k', or only a number cannot be a keyword.

13. An apparatus comprising:
at least one processor; and
at least one memory coupled to the at least one processor, wherein the at least one memory comprises instructions which, when executed by the at least one processor, cause the at least one processor to implement an address-station matching mechanism for matching an address to an optimal station for package delivery, and further causes the at least one processor to:

determine, by matching logic within the address-station matching mechanism whether at least one keyword k in a substring of an address addr associated with a package to be delivered appears in a keyword to station probability matrix associated with a city and/or district associated with the address addr associated with the package;

responsive to the at least one keyword k appearing in the keyword to station probability matrix, for a set of keywords k in the substring of the address addr and station s of the city and/or district, determine by the matching logic, a priority value function v that represents a priority of a combination of keyword k and station s, using:

$$v(k,s)=Pks+\varepsilon *len(k)$$

where v is the priority value function that represents the priority of the combination of keyword k and station s, p is a probability of a keyword to a station from the associated keyword to station probability matrix, $\varepsilon$ is a pre-defined small number, and len is a function to calculate a length of a string;

identify, by the matching logic, a critical keyword k* and optimal station s* using:

$$(k^*,s^*)=\arg\max v(k,s)$$

where v is the priority value function that represents the priority of the combination of keyword k and station s and arg max is an argument of a maximum that is a set of points of the given argument for which a given function attains its maximum value; and report, by the matching logic, an optimal station s* with a maximum determined value for delivery of the package.

14. The apparatus of claim 13, wherein the instructions further cause the at least one processor to:

prior to reporting the optimal station s* for delivery of the package, determine, by the matching logic, whether the maximum determined value for delivery of the package is greater than or equal to a predetermined threshold; and responsive to the maximum determined value for delivery of the package being greater than or equal to the predetermined threshold, report, by the matching logic, the optimal station s* for delivery of the package.

15. The apparatus of claim 13, wherein the instructions further cause the at least one processor to:

prior to reporting the optimal station s* for delivery of the package, determining, by the matching logic, whether the maximum determined value for delivery of the package is greater than or equal to a predetermined threshold; and responsive to the maximum determined value for delivery of the package failing to be greater than or equal to the predetermined threshold, report, by the matching logic, the optimal station s* for delivery of the package with an additional indication of uncertain.

16. The apparatus of claim 13, wherein the instructions generate the keyword to station probability matrix by further causing the at least one processor to:

process, by keyword counting logic within the address-station matching mechanism, a set of addresses associated with a particular city and/or district;

perform, by the keyword counting logic, keyword extraction on a set of addresses addr in the set of addresses thereby forming a set of modified addresses;

identify, by the keyword counting logic, keywords from the set of modified addresses;

count, by the keyword counting logic, an occurrence of each of the set of keywords in a concatenated string of the set of modified address; and generate, by the keyword counting logic, the keyword to station frequency probability matrix using counts of each of the set of keywords whose probability for at least one station s is above a predetermined threshold.

17. The apparatus of claim 16, wherein the instructions to perform the keyword extraction includes the instructions further causing the at least one processor to perform at least one of removing one or more of a city and/or district name in the address addr using a city/district name dictionary, removing room numbers or building numbers in the address addr using a pattern data structure, or removing useless parentheticals in the address addr, and wherein the instructions to identify keywords from the set of modified addresses further causes the at least one processor to:

concatenate, by keyword extraction logic within the address-station matching mechanism, the set of modified addresses into a long character string; and identify, by the keyword extraction logic, a keyword k if one or more conditions are met, wherein the one or more conditions are keyword k has more than L characters, keyword k occurs more than M times, if any string k' containing keyword k as a substring is already a keyword, keyword k should occur at least N times more than k', or only a number cannot be a keyword.

* * * * *